United States Patent
Xiang et al.

(10) Patent No.: US 12,453,615 B2
(45) Date of Patent: Oct. 28, 2025

(54) METHODS AND APPARATUS FOR WIDE ANGLE CHANDELIER ILLUMINATOR

(71) Applicant: Alcon Inc., Fribourg (CH)

(72) Inventors: Qing Xiang, Irvine, CA (US); Timothy C. Ryan, Laguna Hills, CA (US); Yu Yan, Irvine, CA (US)

(73) Assignee: Alcon Inc., Fribourg (CH)

( * ) Notice: Subject to any disclaimer, the term of this patent is extended or adjusted under 35 U.S.C. 154(b) by 0 days.

(21) Appl. No.: 18/047,370

(22) Filed: Oct. 18, 2022

(65) Prior Publication Data

US 2023/0149113 A1    May 18, 2023

Related U.S. Application Data

(60) Provisional application No. 63/264,183, filed on Nov. 17, 2021.

(51) Int. Cl.
*A61B 90/30*    (2016.01)
*A61F 9/007*    (2006.01)

(52) U.S. Cl.
CPC .......... *A61B 90/30* (2016.02); *A61F 9/00754* (2013.01); *A61B 2090/306* (2016.02)

(58) Field of Classification Search
CPC ............... A61B 90/30; A61B 2090/306; A61F 9/00754; A61F 9/00736; A61F 9/0079
See application file for complete search history.

(56) References Cited

U.S. PATENT DOCUMENTS

| | | | |
|---|---|---|---|
| 5,258,002 A * | 11/1993 | Jeffers | A61F 9/0133 30/348 |
| 6,366,726 B1 * | 4/2002 | Wach | G02B 6/29368 385/115 |
| 7,731,710 B2 | 6/2010 | Smith | |
| 7,783,346 B2 | 8/2010 | Smith et al. | |
| 7,824,089 B2 | 11/2010 | Charles | |
| 8,900,139 B2 | 12/2014 | Yadlowsky | |
| 9,072,587 B2 | 7/2015 | Smith | |
| 10,859,748 B2 | 12/2020 | Mirsepassi et al. | |
| 10,888,219 B2 | 1/2021 | Smith et al. | |
| 11,187,859 B2 * | 11/2021 | Rosson | G02B 6/3831 |
| 2005/0078910 A1 | 4/2005 | Hickingbotham | |
| 2006/0184162 A1 | 8/2006 | Smith | |

(Continued)

FOREIGN PATENT DOCUMENTS

| | | | | |
|---|---|---|---|---|
| WO | WO-03045290 A1 * | 6/2003 | ....... | A61B 17/32002 |
| WO | WO-2014145465 A2 * | 9/2014 | ............. | A61B 1/063 |

(Continued)

OTHER PUBLICATIONS

Alcon Surgical Retina Product Catalog, 2019, pp. 28-31.

(Continued)

*Primary Examiner* — Tsion Tumebo
(74) *Attorney, Agent, or Firm* — Patterson + Sheridan, LLP

(57) ABSTRACT

An instrument to facilitate hands-free illumination of an eye for a surgical procedure. The instrument includes an optical end of unique architecture and surfacing such that the instrument may be left immobile while sufficiently illuminating an eye interior with greater than 100° of wide beam spread angle provided. Further, the grind surfacing provided to the end cone of the optical end provides enhanced light distribution.

12 Claims, 6 Drawing Sheets

(56) References Cited

U.S. PATENT DOCUMENTS

| | | | |
|---|---|---|---|
| 2007/0086714 A1* | 4/2007 | Cheng | G02B 6/4203 |
| | | | 385/38 |
| 2008/0108983 A1 | 5/2008 | Nadolski | |
| 2008/0177257 A1* | 7/2008 | Smith | G02B 6/0008 |
| | | | 606/15 |
| 2009/0161384 A1 | 6/2009 | Smith | |
| 2013/0096587 A1* | 4/2013 | Smith | A61B 17/320758 |
| | | | 606/159 |
| 2015/0032190 A1 | 1/2015 | Acker | |
| 2016/0228207 A1 | 8/2016 | Yadlowsky | |
| 2016/0302878 A1 | 10/2016 | Kern | |
| 2017/0042408 A1* | 2/2017 | Washburn | A61B 17/3478 |
| 2017/0172792 A1 | 6/2017 | Mirsepassi | |
| 2017/0290629 A1 | 10/2017 | Brown | |
| 2017/0333151 A1* | 11/2017 | Maholtra | A61B 90/30 |
| 2018/0140373 A1* | 5/2018 | Dos Santos | A61B 90/20 |
| 2018/0168683 A1* | 6/2018 | Nasseri | A61F 9/007 |
| 2018/0271643 A1* | 9/2018 | Gunn | A61L 31/048 |
| 2019/0110924 A1* | 4/2019 | Moreno | A61B 17/3415 |

FOREIGN PATENT DOCUMENTS

| | | |
|---|---|---|
| WO | 2017093927 A1 | 6/2017 |
| WO | 2017103796 A1 | 6/2017 |

OTHER PUBLICATIONS

Oshima, et al., "Self-Retaining 27-Gauge Transconjuctival Chandelier Endoillumination for Panoramic Viewing During Vitreous Surgery," American Journal of Ophthalmology, Elsevier, Amsterdam, N, vol. 143, No. 1, Dec. 19, 2006, pp. 166-167.

* cited by examiner

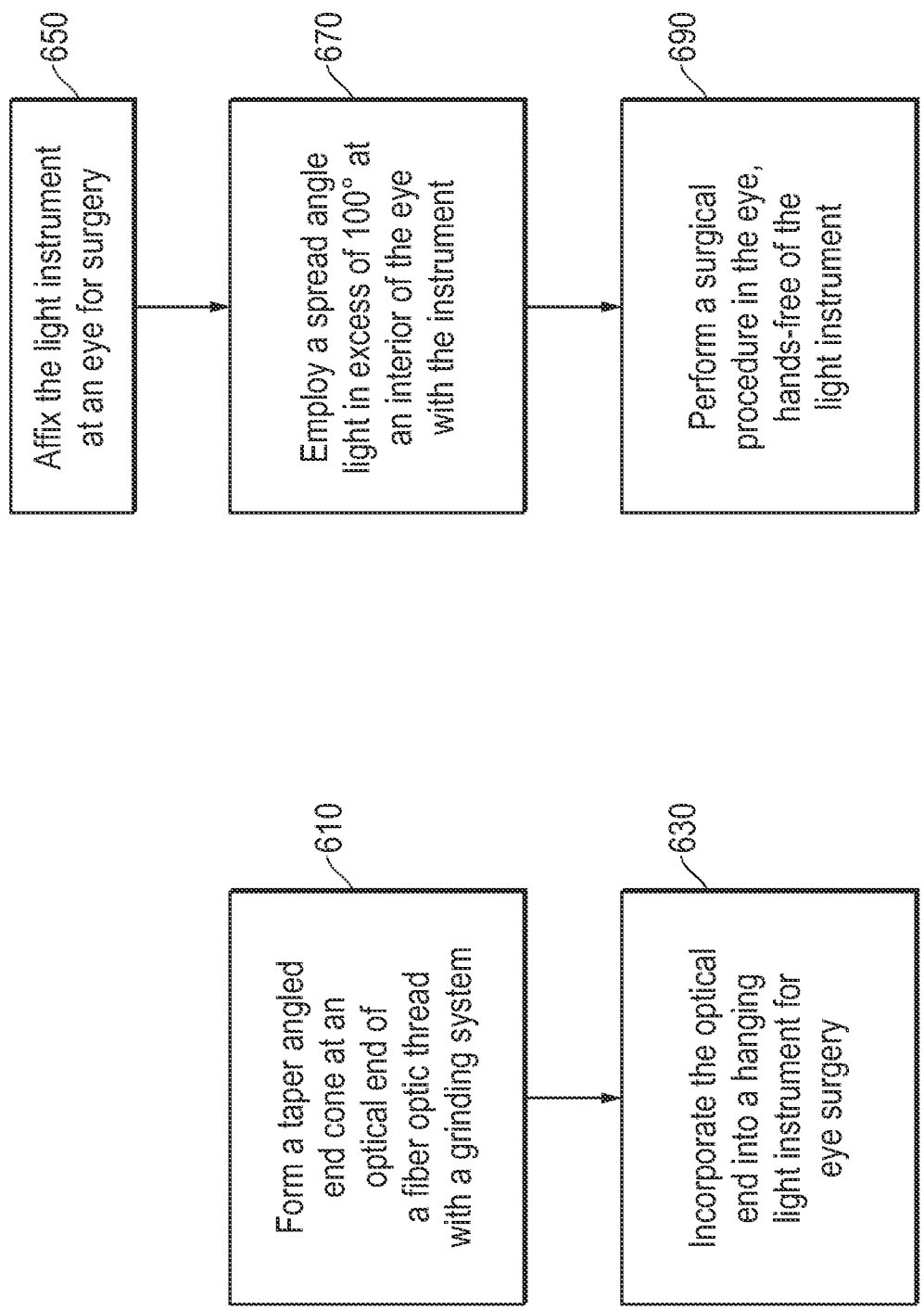

METHODS AND APPARATUS FOR WIDE ANGLE CHANDELIER ILLUMINATOR

PRIORITY CLAIM

This application claims the benefit of priority of U.S. Provisional Patent Application Ser. No. 63/264,183 titled "METHODS AND APPARATUS FOR WIDE ANGLE CHANDELIER ILLUMINATOR," filed on Nov. 17, 2021, whose inventors are Qing Xiang, Timothy C. Ryan, and Yu Yan, which is hereby incorporated by reference in its entirety as though fully and completely set forth herein.

BACKGROUND

During eye surgery (e.g., involving a vitrectomy) the eye may be illuminated. Visualization, directly or through a microscope, may be enhanced through the use of a chandelier light instrument. During eye surgery, a vitrectomy probe needle and the main body of the chandelier may each be inserted through a pre-placed cannula at the surface of the eye. Each cannula provides a structurally supportive conduit strategically located at an offset location at the front of the eye, such as the pars plana. In this way, the probe needle or the chandelier may be guidingly inserted into the eye in a manner that avoids damage to the patient's lens or cornea.

Of course, in order to achieve a successful vitrectomy or other such intervention, some additional tools may be required. This means that if the light instrument is handheld along with a more interventional tool such as a vitrectomy probe, the probe will need to be removed and replaced with the other tool. In this way, the surgeon may maintain a hand dedicated to holding of the light instrument. Of course, another surgeon or medical assistant might maintain the light instrument in place so as to keep both of the surgeon's hands freed up for manipulating more interventional tools. However, in the limited space confines of a surgery directed at an eye, this may not be practical. Once more, the surgeon giving up manipulative control over the light instrument may present a challenge in terms of directing light precisely at the region of the eye intended by the surgeon.

As an alternative to maintaining manual control over the light instrument, a prepositioned chandelier instrument may be utilized. More specifically, a flexible chandelier illuminator may be immobilized by a cannula (or inserted directly) at the eye and bent into a stable position. Thus, the light instrument may be set in place for the duration of the eye surgery. This leaves the surgeon free to personally manipulate multiple other interventional tools without concern over maintaining control over the light instrument.

Visibility or illumination challenges exist for a variety of reasons. However, one of the primary reasons is because of size and dimensional constraints. For example, due to advancements in terms of minimal invasiveness, a conventional chandelier light instrument may generally be smaller than about 25 gauge. This is an incredibly small amount of architectural footspace with which to work. As a result, light distribution from the fiber optic end of the light instrument may display a degree of a focused spot with illumination fairly focused within a narrow targeted location of the eye.

Another reason for the less than ideal distribution of light is the fact that the small gauge dimensions of the fiber optic end are geometrically provided by way of a cutting instrument during manufacturing. That is, the fiber optic end component of the light instrument is shaped by a cutting instrument to terminate the end and provide a degree of a taper. Ideally, the tapering of the fiber optic end by way of the cutting instrument will provide an improved degree of light distribution.

Unfortunately, the cutting of the fiber optic end is likely to result in a shaped surface that may be scratched and compromised in terms of light distribution. Thus, while there may be some improvement in light distribution due to the tapered cut, the effect is minimized. Generally speaking, due to limitations in light distribution, the surgeon may need to manually manipulate the light source in order to ensure light being directed where intended throughout the eye surgery.

SUMMARY

An instrument for affixation in support of an eye surgery. The instrument includes an optical end of enhanced light emitting architecture. Specifically, the instrument includes a base of substantially constant diameter that supports a tapering terminus extending from the base. The terminus is of a predetermined length with an angled taper, also of predetermined angularity. Once more, the surface of the terminus is uniquely ground with substantially scratch-free and uniform light scattering characteristics.

BRIEF DESCRIPTION OF THE DRAWINGS

FIGS. 6A and 6B are flow-charts summarizing embodiments of manufacturing and employing an optical end of a chandelier instrument to facilitate eye surgery.

DETAILED DESCRIPTION

In the following description, numerous details are set forth to provide an understanding of the present disclosure. However, it will be understood by those skilled in the art that the embodiments described may be practiced without these particular details. Further, numerous variations or modifications may be employed which remain contemplated by the embodiments as specifically described.

Embodiments are described with reference to certain types of vitrectomy probe surgical procedures. In particular, a procedure in which vitreous humor is removed to address vitreous hemorrhage is illustrated. However, tools and techniques detailed herein may be employed in a variety of other manners. Specifically, embodiments of chandelier instruments may be utilized to facilitate tools such as a vitrectomy probe in addressing retinal detachments, macular pucker, macular holes, vitreous floaters, diabetic retinopathy or a variety of other eye conditions. Regardless, so long as the surgical procedure is aided by the use of a light instrument having an optical end of unique architecture and grind surface for enhanced lighting of the eye interior, appreciable benefit may be realized.

Figure 1:
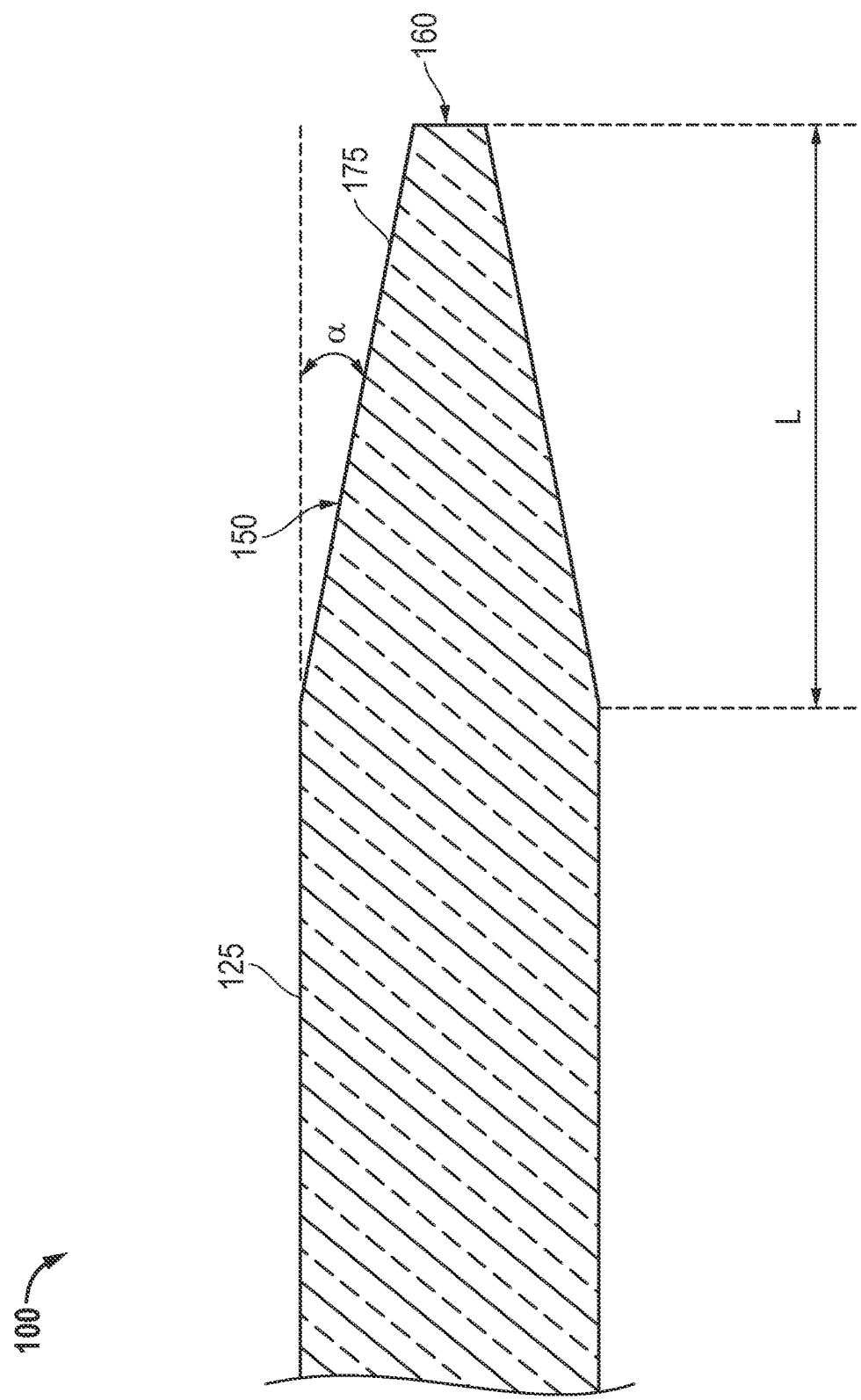
FIG. 1 is a side cross-sectional view of an embodiment of a chandelier instrument optical end of unique architecture and surface to support eye surgery.

Referring now to FIG. 1, a side cross-sectional view of an embodiment of a chandelier instrument optical end 100 is illustrated that is of unique architecture and surface 175 to support eye surgery. The optical end 100 may be comprised of a fiber optic thread with a base 125 that is manufactured with an end cone 150. With added reference to FIG. 3, the end cone 150 is tapered as illustrated to ultimately distribute a wide beam spread angle and light distribution (330). Ultimately, even though the chandelier instrument 350 that incorporates the optical end 100, may be at a fixed location during surgery, sufficient light may be spread throughout the interior of the eye 350 without the need for any repositioning of the instrument 350.

In the embodiment shown, the base 125 may be between about 300 micrometers and 600 micrometers in diameter with the end cone 150 tapering down from there. This may be consistent with current 23-29 gauge instrumentation. In the embodiment shown, the taper of the end cone 150 may extend to under about a millimeter in length (L), perhaps between about 700 and about 850 micrometers. As illustrated, there is a taper that runs across this length to provide the cone appearance and character to the end cone 150. In the embodiment shown, this taper may be defined by an angle (a) that is greater than about 8.5°. More specifically, the angle (a) may be between about 9° and 13°. As described below, when combined with a grinded end cone surface 175, this type of architecture provides a distribution of light 330 with a wide beam spread angle (θ) in excess of 100° (see FIG. 3). As used herein, the term "spread angle" refers to an angle that is evaluated in terms of conventional Full Width Maximum (FW5% M) standard. However, other illumination metrics may be applicable.

In the embodiment shown, the end cone 150 is outfitted with a blunt end 160. The blunt end 160 shape may merely avoid an end cone 150 with an impractically sharpened terminus that might be prone to breaking or cracking in a manner that might present optical or other performance issues to the optical end 100. Nevertheless, as with the cone surface 175, the face of the blunt end 160 may be formed by grinding and/or polishing as described further below. Whatever the case, as with the cone surface 175, conventional mechanical cutting may be avoided so as to mitigate the possibility of scratching or other non-diffusive or non-uniform surface characteristics.

Figure 2:
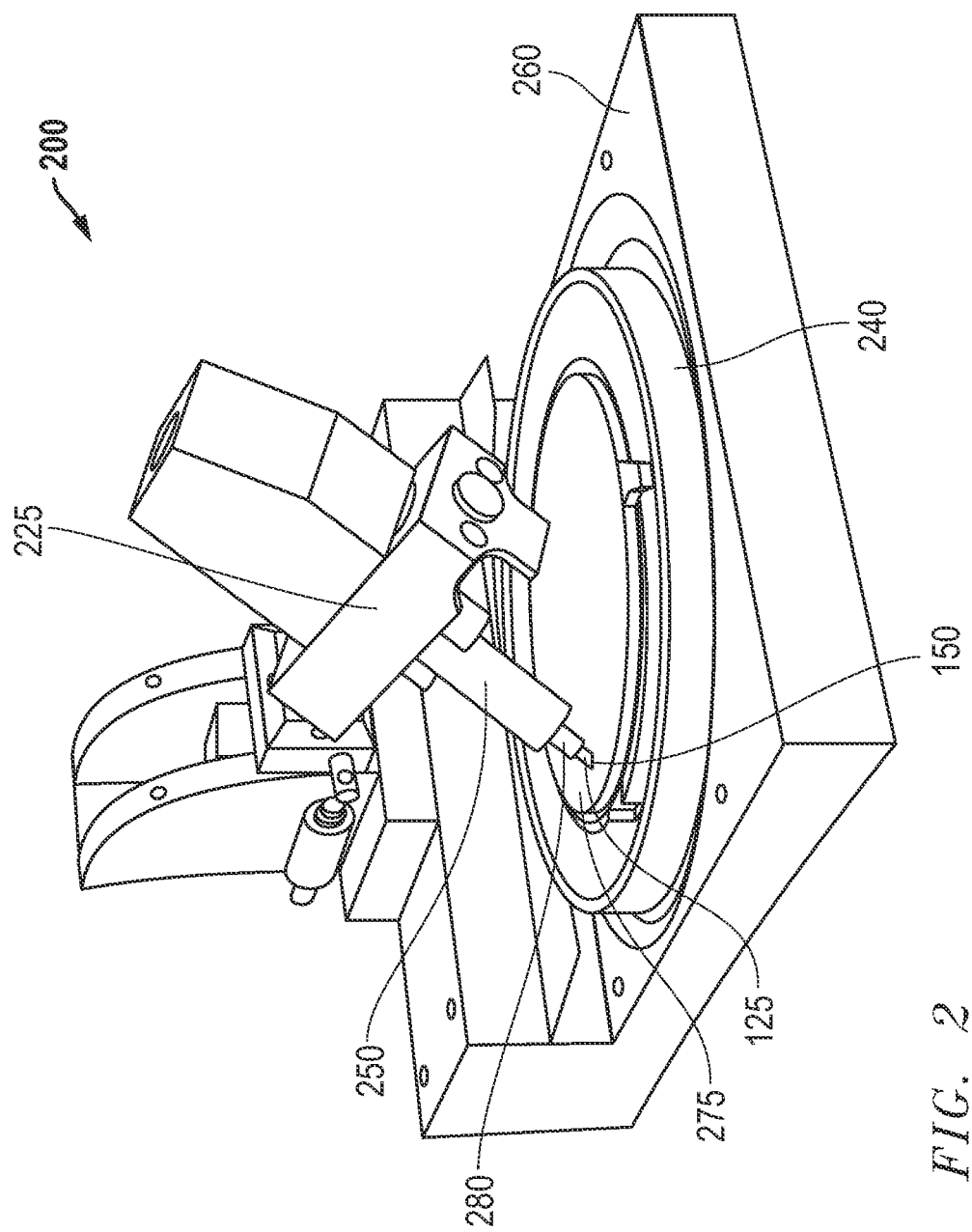
FIG. 2 is a perspective overview of a grinding system to facilitate unique surfacing for the optical end of FIG. 1.

Referring now to FIG. 2, a perspective overview of a grinding system 100 to facilitate unique surfacing for the optical end 125 of FIG. 1. That is, with added reference to FIG. 1 as indicated above, forming of the surface 175 is achieved, at least in part, through a grinding technique rather than conventional cutting. In this way, the end cone 150 is left with a surface 175 of enhanced light distribution character. In the embodiment shown, the system 200 includes a grind plate 240 to facilitate a tailored circular grinding of a grind pad 275 secured thereto. In one embodiment, the circular grinding takes place in an irregular manner with the center of the rotating plate 240 shifting location as the pad 275 is rotated. Further, as used herein, the term "grinding" may refer to a grinding with a courser material of the pad as described below or a finer polishing. Regardless, the surface 175 of the end cone 150 from a uniform diameter fiber optic to a shape of the end cone 150 is achieved by way of a less abrasive technique than what is attainable through conventional cutting.

Continuing with reference to FIG. 2, the grind plate 240 and pad 275 are directed by a drive located below at a grind table 260, although other system configurations may be utilized. Other hardware of the system 200 includes an orienting device 225 or work holder that is angled to present a tubular extension 250 to the pad 275. Thus, the fiber optic end 125 may presented to the pad 275 at the intended orientation for forming the tapered end cone 150 with angle (a) as illustrated in FIG. 1. The pad 275 may include a grinding film. In one embodiment, the film is a 12 micrometer aluminum film that may incorporate silicate or diamond particles for fine grinding or polishing of the fiber optic to the end cone 150 shape and form. In other embodiments, the film may range between about 1 and about 40 micrometers. Thus, the process may be considered as ranging from polishing to grinding, either of which may be referred to as grinding herein. Regardless, an enhanced taper geometry and surfacing for increasing spread angle and smooth light distribution as discussed further below may be attained.

The taper forming process of the end cone 150 through grinding as described may include periodic rotation of the fiber optic by or within the tubular extension 250. The work holder/orienting device 225 may be used to guide and maintain tilted rotation of the fiber optic until the end cone 150 shape is attained. At the same time, guided rotation of the pad 275 according to a predetermined protocol is also maintained by the system 200. In one embodiment, the end cone 150 is formed with a pointed terminus that is later polished or grinded to the blunt end 160 of FIG. 1 with the same system 200 by re-orienting the orienting device 225 to a vertical or perpendicular orientation relative the pad 275 to continue the process and to form the blunt end 160.

Figure 3:
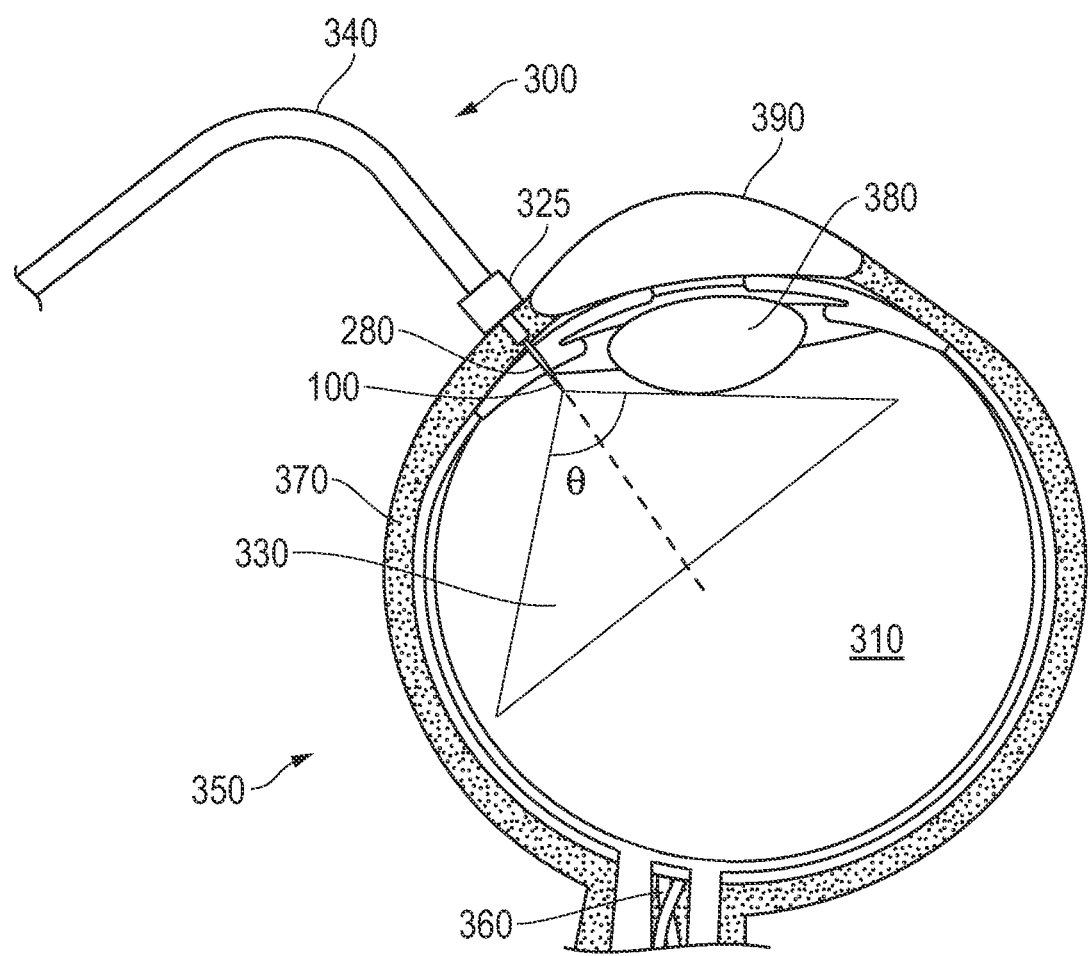
FIG. 3 is a partially sectional overview of an eye prepared for a surgery facilitated by the instrument and optical end of FIG. 1.

In the embodiment shown, note that an instrument sleeve 280 is present, emerging from the extension 250. This sleeve 280 may be a structural component present in the finalized form of the light instrument 300 as illustrated in FIG. 3 and may also provide added stability or security to the underlying fiber optic during the described grinding process. In the embodiment shown, the instrument 300 of FIG. 3 may be a 27 gauge instrument, largely determined by the sleeve 280 dimensions which constitute the largest portion of the instrument 300 set to traverse a preplaced cannula 325 as described below. However, other suitable sizing may be employed.

Referring now to FIG. 3, a partially sectional overview of an eye 350 is illustrated that is prepared for a surgery facilitated by the instrument 300 and optical end 100 of FIG. 1. In this view, the fixed nature of the chandelier instrument 300 is apparent. This means that instead of being handheld, the instrument 300 is located at a fixed position such that further advancement of the optical end 100 is prohibited with the optical end 100 providing light 330 from an unchanging position at the interior of the eye 310. Considering the limited size of the eye interior 310, generally under about 1 inch in diameter, this provides an element of safety to the surgical procedure to be performed. For example, the instrument 300 and optical end 100 are prohibited from unintentionally reaching or disturbing the optic nerve 360 or retina 460 at the back of the eye 350 (see FIG. 4). In some embodiments, the light 330 is of an enhanced distribution with a spread angle (θ) exceeding 100° (other angles are also possible (such as less than or greater than 100°. Thus, visualization for the surgeon is optimized for the procedure. Once more, this means that visualization is substantially unhindered while at the same time, freeing up a hand of the surgeon to perform other surgical tasks.

Continuing with reference to FIG. 3, a preplaced cannula 325 has been located at an offset position of the sclera 370 so as to avoid injury to more delicate lens 380, cornea 390 or other delicate features at the front of the eye 350. The instrument 300 may thus engage and traverse the cannula 325 to advance the sleeve 280 and optical end 100 to the illustrated position. For stabilization, an instrument handle 340 may be bent into position and other measures taken to affix the instrument 300 in place, such as the use of medical tape.

As indicated, the spread angle (θ) of the light 330 emitted from the optical end 100 may exceed 100°. With added reference to FIG. 1, for an optical thread of between about 350 micrometers and 450 micrometers, measured at the base 125, this may be achievable by utilizing a grind manufactured taper angle (α) of between about 9° and 13°. For the optical end 100, this would translate to a taper length (L) of between about 700 micrometers and about 850 micrometers.

The larger beam spread angle (θ) may be accompanied by a smooth beam distribution absent any hot center or sharp edge beam pattern. Additionally, the entire interior of the eye 310 may be comparatively brighter without any increase in luminous flux output when compared to conventional instrument output.

Figure 4:
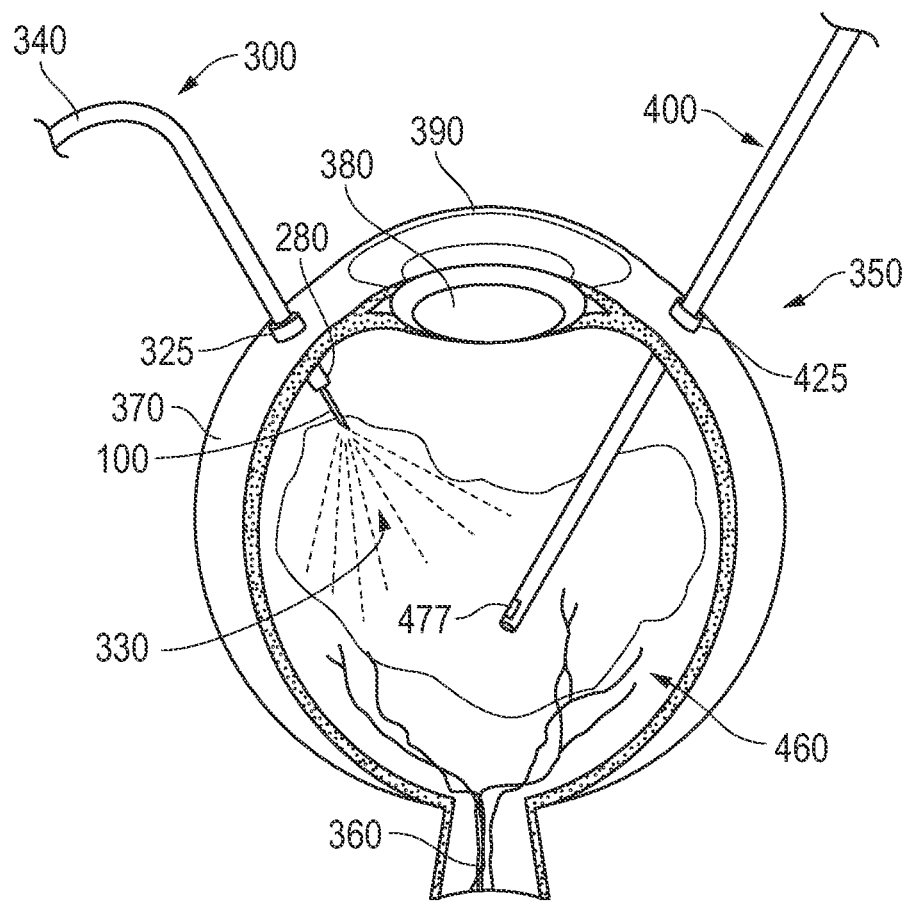
FIG. 4 is a partially sectional overview of the eye during a surgery facilitated by the instrument and optical end as shown in FIG. 3.

Referring now to FIG. 4, a partially sectional overview of the eye 350 is illustrated during a surgery facilitated by the instrument 300 and optical end 100 as shown in FIG. 3. In this view, a vitrectomy needle 400 is being utilized to address an eye issue such as treating a hemorrhage in a given eye region. This begins with the needle 400 being inserted through another preplaced cannula 425. A suction may be applied and a port 477 of the needle 400 may be utilized for the uptake of blood from the hemorrhage and vitreous humor. Notice that the cannula 425 is again positioned in an offset manner at the sclera 370. In this way, the more delicate cornea 390 and lens 380 are again avoided. By the same token, the optic nerve 360 is also quite delicate. Thus, visibility may be key to ensuring that the needle 400 does not inadvertently contact the nerve 360, retina 460 or other delicate features at the back of the eye 350.

This sought visualization is more than adequately facilitated by the instrument 300 and optical end 100 as illustrated here and detailed above. Specifically, light 330 is provided that is smooth and evenly distributed with a spread angle (θ) exceeding 100 (see FIG. 3). As a result, not only is surgical performance enhanced but so too is safety in carrying out the illustrated procedure. Thus, in spite of other challenges, such as the surgeon's observation angle likely being off-center, good illumination and visualization may be provided for the procedure.

Figure 5:
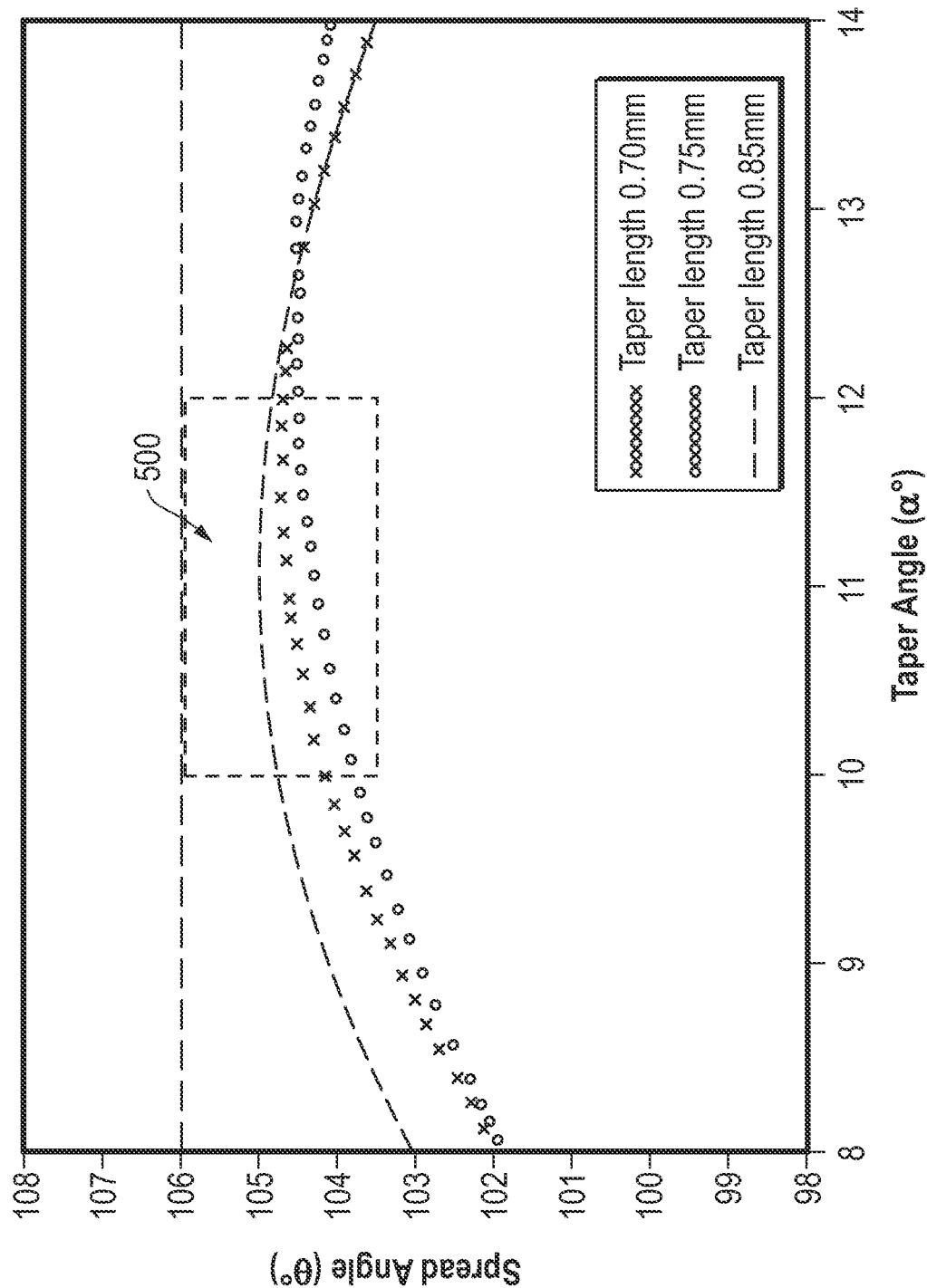
FIG. 5 is a chart highlighting a targeted manufacturability window for various architectures of the optical end of the instrument of FIG. 1.

Referring now to FIG. 5, a chart is shown highlighting a targeted manufacturability window 500 for various architectures of the optical end 100 of the instrument of FIG. 1. In actual practice, spread angle results noted at the y-axis of the chart may vary by a degree or two from the simulated result curves illustrated by the chart of FIG. 5. Nevertheless, the chart and these curves may provide a useful guide in terms of seeking repeatability of expected results as a manufacturing aid.

Continuing with reference to FIG. 5, with added reference to FIG. 1, a fiber optic thread of between about 375 micrometers and about 425 micrometers as measured at the base 125 may be utilized. With such a thread available, and a minimum spread angle (θ) of 100° sought, the light emitting properties of different taper lengths and angles may be examined. For example, different taper angles (α) ranging from 8° to 14° are examined over different taper lengths (L).

Whether the taper length (L) is 0.70 mm, 0.75 mm or 0.85 mm, it is apparent that the expected spread angle (θ) will exceed 100° so long as the taper angle (α) is within the 8° to 14° range depicted. For tighter results, the manufacturer may seek to narrow the range of taper angle (α) options to a peak window 500 where greater spread angles (θ) may be repeatedly observed. In the embodiment shown, for the evaluated taper lengths (L), it is apparent that a spread angle (θ) minimum of 103° degrees is attainable so long as the taper angle (α) of between about 10° and 12° is utilized. Of course, results may vary and this is only an example of how such a window 500 might be established as a manufacturing aid.

Referring now to FIGS. 6A and 6B, flow-charts are shown illustrating embodiments of manufacturing and employing an optical end of a chandelier instrument to facilitate eye surgery. Specifically, as noted in 6A, a taper angled end cone may be formed at the optical end of a fiber optic thread with a grinding system as detailed hereinabove (see 610). The architectural parameters of the optical end may be predetermined in light of tested and expected results as also described above. Regardless, upon execution of the predetermined grinding techniques utilized, the optical end may be incorporated into a chandelier instrument for eye surgery as indicated at 630. Thus, as shown in FIG. 6B, the light instrument may be affixed for an eye surgery (see 650). This means that a spread angle in excess of 100° may be attained through the optical end at the interior of the eye during the surgery (see 670). As a result, as indicated at 690, a surgical procedure may take place without requiring the surgeon to manually hold the light instrument. Further, this may occur without sacrifice to eye interior illumination.

Embodiments described hereinabove include tools and techniques that allow for the use of a light instrument with an optical end of unique architecture to facilitate a wide angle emission of light. Once more, the surface of the optical end may be formed or enhanced by grinding in place of conventional cutting to further enhance uniformity of distribution throughout the eye interior during surgery.

The preceding description has been presented with reference to presently preferred embodiments. However, other embodiments and/or features of the embodiments disclosed but not detailed hereinabove may be employed. Furthermore, persons skilled in the art and technology to which these embodiments pertain will appreciate that still other alterations and changes in the described structures and methods of operation may be practiced without meaningfully departing from the principle and scope of these embodiments. Additionally, the foregoing description should not be read as pertaining only to the precise structures described and shown in the accompanying drawings, but rather should be read as consistent with and as support for the following claims, which are to have their fullest and fairest scope.

The invention claimed is:

1. A chandelier instrument for affixation during an eye surgery, the instrument including an optical end of enhanced light distribution character and comprising:

a base with a substantially constant diameter of between about 300 micrometers and about 600 micrometers;

a tapered end cone extending from the base, the tapered end cone having a length of between about 700 micrometers and about 850 micrometers with a taper angle greater than about 8.5°;

an outer grind surface of the tapered end cone formed by circular grinding, the surface of substantially uniform light scattering character;

wherein the tapered end cone further comprises a blunt distal end formed by at least one of grinding and polishing; and wherein the tapered end cone is configured to provide a beam spread angle in excess of about 100° with a smooth beam distribution absent any hot center or sharp edge beam pattern.

2. The instrument of claim 1, wherein the end cone is substantially scratch-free and tailored to distribute a wide beam spread angle in excess of about 100°.

3. The instrument of claim 1 wherein the base diameter is between about 350 micrometers and about 450 micrometers and the taper angle is between about 9° and 13°.

4. The instrument of claim 1 wherein the blunt end includes an outer grind surface.

5. The chandelier instrument of claim 1, wherein the chandelier instrument further comprises a sleeve surrounding the base.

6. The chandelier instrument of claim 5, wherein the sleeve is 27 gauge.

7. A method, comprising:
presenting a fiber optic thread to a grind system to form an end cone with a taper angle in excess of about 8.5° over a taper length of between about 700 micrometers and about 850 micrometers;

incorporating the end cone into a chandelier light instrument to facilitate a surgical procedure with a wide beam spread angle from the end cone in excess of about 100°;

wherein the presenting comprises employing a grind pad for grinding an outer grind surface defining the end cone to facilitate enhanced light distribution for the surgical procedure;

wherein the presenting comprises a circular grinding that occurs in an irregular manner with the center of a rotating plate shifting location as a circular grind pad is rotated;

wherein the end cone is formed with a pointed terminus; and wherein the grinding further comprises grinding the pointed terminus to a blunt distal end on the end cone.

8. The method of claim 7 wherein the grinding comprises polishing to form the outer grind surface.

9. The method of claim 7 wherein the grind pad is a film that incorporates one of aluminum, silicate and diamond particles ranging in size from between about 1 micrometer and about 40 micrometers.

10. The method of claim 7, further comprising providing a sleeve around a base of the chandelier instrument.

11. The method of claim 10, wherein the sleeve is 27 gauge.

12. The method of claim 7, wherein the presenting further comprises a periodic rotation of the fiber optic.

* * * * *